United States Patent [19]

Pettrone et al.

[11] Patent Number: 5,753,402
[45] Date of Patent: May 19, 1998

[54] METHOD FOR RECORDING AND PROCESSING MOTION PICTURE FILM SOUNDTRACK

[75] Inventors: Frank Anthony Pettrone; Richard Carl Sehlin, both of Rochester, N.Y.; Mary Lynn Schmoeger, Mishawaka, Ind.

[73] Assignee: Eastman Kodak Company, Rochester, N.Y.

[21] Appl. No.: 680,466

[22] Filed: Jul. 15, 1996

Related U.S. Application Data

[60] Provisional application No. 60/001,698, Jul. 31, 1995.
[51] Int. Cl.$^6$ .............................. G03C 5/14; G03C 1/825; G03B 31/02
[52] U.S. Cl. ............................ 430/140; 430/510; 352/27; 352/37
[58] Field of Search ................................. 430/140, 510; 352/27, 37

[56] References Cited

U.S. PATENT DOCUMENTS

| | | | |
|---|---|---|---|
| 1,905,188 | 4/1933 | Sease | 430/513 |
| 2,171,911 | 9/1939 | Bloch | 430/513 |
| 2,176,303 | 10/1939 | Jones | 430/140 |
| 2,220,178 | 11/1940 | Schneider | 430/140 |
| 2,341,508 | 2/1944 | Schneider | 430/140 |
| 2,571,688 | 10/1951 | Dickinson | 430/4 |
| 2,763,550 | 9/1956 | Lovick | 430/140 |
| 2,921,914 | 1/1960 | Pechmann | 430/4 |
| 3,243,295 | 3/1966 | Vegt | 430/140 |
| 3,705,799 | 12/1972 | Bello et al. | 430/140 |
| 4,139,382 | 2/1979 | Stephens | 430/140 |
| 4,178,183 | 12/1979 | Ciurca, Jr. et al. | 430/140 |
| 5,030,544 | 7/1991 | Olbrechts et al. | 430/140 |
| 5,246,823 | 9/1993 | Shuman | 430/510 |
| 5,483,306 | 1/1996 | Rodriguez | 354/10 |
| 5,587,749 | 12/1996 | Goldberg et al. | 352/27 |

FOREIGN PATENT DOCUMENTS

| | | |
|---|---|---|
| 644575 | 10/1950 | United Kingdom . |
| 746569 | 3/1956 | United Kingdom . |
| 1424454 | 2/1976 | United Kingdom . |

*Primary Examiner*—Mark F. Huff
*Attorney, Agent, or Firm*—Andrew J. Anderson

[57] ABSTRACT

By processing color motion picture film to yield a dye-only, "silver-less" soundtrack, an antihalation layer containing silver may be incorporated into the film without interfering with the soundtrack signal in the resulting processed film. The process results in good antihalation protection of the print film during exposure, and a simplified processing procedure which does not require special processing of the exposed soundtrack relative to the image area frames. One embodiment of the invention comprises a method for recording and processing image area frames and an optical soundtrack in a color motion picture film comprising a support bearing blue, green, and red light sensitive silver halide emulsion dye forming layers and an antihalation layer, comprising imagewise exposing said emulsion layers in accordance with desired image area frames, exposing at least one of said emulsion layers in accordance with an analog soundtrack, and processing the exposed film to yield corresponding dye images in the exposed image area frames and analog soundtrack; wherein said antihalation layer comprises a hydrophilic colloid layer containing silver, and wherein said film is processed to yield a dye-only, silverless analog soundtrack, the soundtrack region of the film not being subjected to any specialized processing treatment relative to the image area frame region.

14 Claims, No Drawings

METHOD FOR RECORDING AND PROCESSING MOTION PICTURE FILM SOUNDTRACK

CROSS REFERENCE TO RELATED APPLICATION

Reference is made to and priority claimed from U.S. Provisional Application Ser. No. 60/001,698, filed 31 Jul. 1995, entitled METHOD FOR RECORDING AND PROCESSING MOTION PICTURE FILM SOUNDTRACK.

TECHNICAL FIELD

This invention relates generally to the field of motion pictures, and in particular to systems and methods for recording, processing, and projecting a motion picture film having both image area frames and an optical soundtrack. In a particular aspect it relates to a system and a method in which a silverless analog dye soundtrack is formed in a motion picture film.

BACKGROUND OF THE INVENTION

Motion picture print film, the film that is shown in movie theaters, commonly employs an optical analog soundtrack along an edge of the film. During projection of the motion picture images, a light source illuminates the analog soundtrack and a photosensor senses the light passing through and modulated by the soundtrack to produce an audio signal that is sent to amplifiers of the theater sound system. While the most common soundtracks are of the "variable area" type wherein the signal is recorded in the form of a varying ratio of opaque to relatively clear area along the soundtrack, "variable density" soundtracks are also known wherein the absolute density is uniformly varied along the soundtrack. Common sound systems incorporate a photodiode in the projector whose radiant sensitivity peaks at approximately 800–950 nm (depending on the type of photodiode), which detects the predominant infra-red (IR) radiation emitted by common tungsten lamps.

A dye soundtrack may be formed in color motion picture film in accordance with conventional exposing and color development processing. Such dye soundtracks may be formed in multiple photosensitive emulsion layers of the motion picture film, or may be restricted to a single emulsion layer as set forth in U.S. Pat. No. 2,176,303. In order to provide effective modulation of common projector soundtrack illumination light, however, motion picture print film is typically processed according to a complex system wherein the optical analog soundtrack area of the print film is developed differently from the picture image frame area so that a silver image is left in the soundtrack area of the film, whereas all the silver is removed in the picture frame area, leaving only a dye image. The silver image may be reformed selectively in the soundtrack area of the film through selective application of a second developer solution after initial uniform color development (which develops exposed silver halide in both the picture area and soundtrack area up to silver metal and generates image dye), stop bath and fixer (arrests development and removes undeveloped silver halide), and bleach (converts exposed, developed silver back to silver halide in both the picture area and soundtrack area) steps. The second development step typically comprises application of a thick, viscous solution of a conventional black and white developer with a cellulose compound such as nitrosyl in a stripe solely onto the soundtrack area of the film, causing the silver halide in the soundtrack area to be selectively developed back into silver metal, while not affecting the silver halide in the image area. A subsequent fixing step then removes the silver halide from the image area, while leaving a silver image corresponding to the soundtrack exposure. Various other techniques are also known for retaining silver in the soundtrack area, but all such approaches invariably entail certain processing disadvantages, such as critical reactant concentration control and area-selective reactant application requirements. Examples of such techniques, e.g., are set forth in U.S. Pat. Nos. 2,220,178, 2,341,508, 2,763,550, 3,243,295, 3,705, 799, 4,139,382.

Photographic elements typically comprise some form of antihalation protection. Halation has been a persistent problem with photographic films comprising one or more photosensitive silver halide emulsion layers coated on a transparent support. The emulsion layer diffusely transmits light, which then reflects back into the emulsion layer from the support surface. The silver halide emulsion is thereby reexposed at locations different from the original light path through the emulsion, resulting in "halos" on the film surrounding images of bright objects.

One method proposed for preventing halation in photographic films comprises using a support which contains dyes or pigments. Such approach is undesirable for motion picture print films, as the added dyes or pigments in the support would detract from the projected image. Another proposed method comprises providing a dyed or pigmented layer behind a clear support as an antihalation backing layer, wherein the backing layer is designed to be removed during processing of the film. Typical examples of such antihalation backing layers comprise a dye or pigment (such as carbon black) which functions to absorb the light dispersed in an alkali-soluble polymeric binder (such as cellulose acetate hexahydrophthalate) that renders the layer removable by an alkaline photographic processing solution. Such backing layers have been commonly used for antihalation protection in motion picture films. While such backing layers provide effective antihalation protection during exposure, however, their use requires special additional processing steps for their subsequent removal, and incomplete removal of the carbon particles can cause image defects in the resulting print film.

A third proposed method for antihalation protection for photographic materials comprises use of an antihalation undercoat layer containing filter dyes or silver metal coated between the support and the emulsion layers, wherein the filter dyes or silver is solubilized and removed during processing of the film. Such antihalation undercoats have also been commonly used in motion picture films. The use of dyes in such an undercoat layer, however, can result in problems during processing, as such dyes may season out into the developer solution. The developer solution overflow is typically reused to make developer replenisher. The dyes in these solutions can therefore accumulate to high levels, and can often have deleterious effects such as adverse sensitometric responses from films, a higher dirt level in the process, precipitates, clogged filters, negative effects on the level of recycling and the reuse of process solutions and resins, higher chemical usage, and the darker appearance of process solutions. Further, antihalation layers containing silver metal are generally not preferred for use in motion picture print films as the conventional processing steps performed for forming a silver containing soundtrack described above will result in silver from the antihalation layer being retained in the soundtrack area of the film, which would interfere with the soundtrack signal. While processes have been proposed for the selective removal of silver from a silver containing antihalation layer or filter layer while retaining silver in a soundtrack, such processes again require critical reactant concentration control and/or area-selective reactant application.

It would be desirable to provide a system and method for recording and processing a color motion picture film having both image area frames and an optical soundtrack which provides good antihalation protection for the print film and simplified processing requirements.

SUMMARY OF THE INVENTION

We have found that by processing color motion picture film to yield a dye-only, "silver-less" soundtrack, an antihalation layer containing silver may be incorporated into the film without interfering with the soundtrack signal in the resulting processed film. The process results in good antihalation protection of the print film during exposure, and a simplified processing procedure which does not require special processing of the exposed soundtrack relative to the image area frames.

One embodiment of the invention comprises a method for recording and processing image area frames and an optical soundtrack in a color motion picture film comprising a support bearing blue, green, and red light sensitive silver halide emulsion dye forming layers and an antihalation layer, comprising imagewise exposing said emulsion layers in accordance with desired image area frames, exposing at least one of said emulsion layers in accordance with an analog soundtrack, and processing the exposed film to yield corresponding dye images in the exposed image area frames and analog soundtrack; wherein said antihalation layer comprises a hydrophilic colloid layer containing silver, and wherein said film is processed to yield a dye-only, silverless analog soundtrack, the soundtrack region of the film not being subjected to any specialized processing treatment relative to the image area frame region.

DETAILED DESCRIPTION

In motion picture color printing, there are usually three records to record simultaneously in the image area frame region of a print film, i.e., red, green and blue. The original record to be reproduced is preferably an image composed of sub-records having radiation patterns in different regions of the spectrum. Typically it will be a multicolor record composed of sub-records formed from cyan, magenta and yellow dyes. The principle by which such materials form a color image are described in James, The Theory of the Photographic Process, Chapter 12, Principles and Chemistry of Color Photography, pp 335–372, 1977, Macmillan Publishing Co. New York, and suitable materials useful to form original records are described in Research Disclosure, December, 1987, Item 17643, published by Industrial Opportunities Ltd., Homewell Havant, Hampshire, P09 1EF, United Kingdom, and Research Disclosure, September 1994, Item 36544, published by Kenneth Mason Publications, Ltd., Emsworth, Hampshire P010 7DQ, England. Materials in which such images are formed can be exposed to an original scene in a camera, or can be duplicates formed from such camera origination materials, such as records formed in color negative intermediate films such as those identified by the tradenames Eastman Color Intermediate Films 2244, 5244 and 7244. The peak absorptions for such films are in the blue region of the spectrum at about 440 nm, in the green region of the spectrum at about 540 nm, and in the red region of the spectrum at about 680 nm.

The motion picture print film used in the process of the invention preferably comprise a support bearing light sensitive dye forming layers sensitized to the blue (approx. 380–500 nm), green (approx. 500–600 nm), and red (approx. 600–760 nm) regions of the electromagnetic spectrum. In accordance with a preferred embodiment of the invention, the motion picture print film comprises cyan, magenta and yellow dye forming silver halide emulsion layers sensitized to the red, green and blue regions of the spectrum. Such materials are described in the Research Disclosure publications cited above. It is within the scope of this invention for the light sensitive material to also be sensitive to one or more regions of the electromagnetic spectrum outside the visible, such as the infra red region of the spectrum. In most color photographic systems, color-forming couplers are incorporated in the light-sensitive photographic emulsion layers so that during development, it is available in the emulsion layer to react with the color developing agent that is oxidized by silver image development. Diffusible couplers are used in color developer solutions. Non-diffusing couplers are incorporated in photographic emulsion layers. When the dye image formed is to be used in situ, couplers are selected which form non-diffusing dyes. Color photographic systems can also be used to produce black-and-white images from non-diffusing couplers as described by Edwards et al in International Publication No. WO 93/012465.

In the following discussion of suitable materials for use in the emulsions and elements that can be used in conjunction with the invention, reference will be made to Research Disclosure, September 1994, Item 36544, available as described above, which will be identified hereafter by the term "Research Disclosure." The contents of the Research Disclosure, including the patents and publications referenced therein, are incorporated herein by reference, and the Sections hereafter referred to are Sections of the Research Disclosure, Item 36544.

Suitable silver halide emulsions and their preparation as well as methods of chemical and spectral sensitization are described in Sections I, and III–IV. Vehicles and vehicle related addenda are described in Section II. Dye image formers and modifiers are described in Section X. Various additives such as UV dyes, brighteners, luminescent dyes, antifoggants, stabilizers, light absorbing and scattering materials, coating aids, plasticizers, lubricants, antistats and matting agents are described, for example, in Sections VI–IX. Layers and layer arrangements, color negative and color positive features, scan facilitating features, supports, exposure and processing can be found in Sections XI–XX.

The print film used in accordance with the invention comprises an antihalation layer comprising a hydrophilic colloid and silver. The antihalation layer may be located between the light sensitive layers and the support, or may be positioned on the back side of the support opposite to the light sensitive layers. In preferred embodiments of the invention, the hydrophilic colloid is gelatin. This may be any gelatin or modified gelatin such as acetylated gelatin, phthalated gelatin, oxidized gelatin, etc. Gelatin may be base-processed, such as lime-processed gelatin, or may be acid-processed, such as acid processed ossein gelatin. The hydrophilic colloid may be another water-soluble polymer or copolymer including, but not limited to poly(vinyl alcohol), partially hydrolyzed poly(vinylacetate/vinylalcohol), hydroxyethyl cellulose, poly(acrylic acid), poly(1-vinylpyrrolidone), poly(sodium styrene sulfonate), poly(2-acrylamido-2-methane sulfonic acid), polyacrylamide. Copolymers of these polymers with hydrophobic monomers may also be used.

The silver of the antihalation layer preferably comprises metallic silver or non-photosensitive silver salts of the types previously proposed for use in photographic element antihalation and filter layers, such as described, e.g., in U.S. Pat. Nos. 1,905,188, 2,171,911, 2,571,688, 2,921,914, and 5,246,823, the disclosures of which are hereby incorporated by reference. These include, e.g., Carey-Lea yellow colloidal silver (conventionally used in yellow filter layers), Pechmann blue colloidal silver (U.S. Pat. No. 2,921,914), gray silver (see James, *The Theory of the Photographic Process*, 4th Ed., p.579), and tabular silver grains (U.S. Pat. No. 5,246,823). The use of conventional gray silver antihalation layers is particularly preferred. Conventional gray silver may be formed by precipitation of silver chloride and the addition of a fogging developer to produce filamentary silver similar to the morphology customarily encountered when conventional silver halide films are processed in a black and white developer.

In addition to the light sensitive dye forming layers and the silver containing antihalation layers described above, the print film used in accordance with the invention may include further features and layers as are known in the art. For example, an antistatic layer may be included on either side of the support, along with additional conventional interlayers and overcoat layers. Preferred supports for the print films comprise transparent polymeric films, such as cellulose nitrate and cellulose esters (such as cellulose triacetate and diacetate), polycarbonate, and polyesters of dibasic aromatic carboxylic acids with divalent alcohols such as poly (ethylene terephthalate).

In a preferred embodiment of the invention, an antistatic layer is coated on the backside of the print film support opposite to the light sensitive layers. Any antistatic materials such as those previously suggested for use with photographic elements may be used. Such materials include, e.g., ionic polymers, electronic conducting non-ionic polymers, and metal halides or metal oxides in polymer binders.

Conductive fine particles of crystalline metal oxides dispersed with a polymeric binder have been used to prepare optically transparent, humidity insensitive, antistatic layers for various imaging applications. Many different metal oxides, such as AnO, $TiO_2$, $ZrO_2$, $Al_2O_3$, $SiO_2$, MgO, BaO, $MoO_3$, and $V_2O_5$, are disclosed as useful as antistatic agents in photographic elements or as conductive agents in electrostatographic elements in such patents as U.S. Pat. Nos. 4,275,103; 4,394,441; 4,416,963; 4,418,141; 4,431,764; 4,495,276; 4,571,361; 4,999,276; and 5,122,445, the disclosures of which are hereby incorporated by reference. Preferred metal oxides are antimony doped tin oxide, aluminum doped zinc oxide, and niobium doped titanium oxide, as these oxides have been found to provide acceptable performance characteristics in demanding environments. Particular preferred metal oxides for use in this invention are antimony-doped tin oxide and vanadium pentoxide which provide good resistance to static discharge.

If desired, the print films can be used in conjunction with an applied magnetic layer as described in *Research Disclosure*, November 1992, Item 34390 published by Kenneth Mason Publications, Ltd., Dudley House, 12 North Street, Emsworth, Hampshire P010 7DQ, ENGLAND.

In accordance with the invention, the image area frame region of the print film is conventionally imagewise exposed to produce a latent image in the red, green and blue light photosensitive layers of the print film. The soundtrack region of the print film is exposed to produce a latent image corresponding to an analog soundtrack in at least one photosensitive layer of the print film. While the analog sound track may be recorded in more than one photosensitive layer of the print film (e.g., in both the red and green light sensitive layers as is conventionally practiced), in a preferred embodiment of the invention the exposure is limited to a single photosensitive layer through choice of soundtrack exposing light, filters, etc. In a most preferred embodiment of the invention, only the red light photosensitive cyan dye forming layer is exposed in accordance with the analog soundtrack. This may be conveniently done through use of a red light emitting diode laser in recording the soundtrack.

After the motion picture print films are exposed, they are processed in accordance with this invention to form a visible color image in the image area frame region of the film and a silverless "dye only" analog soundtrack. Processing a silver halide color photographic light-sensitive material is basically composed of two steps of 1) color development and 2) desilvering. The desilvering stage comprises a bleaching step to change the developed silver back to an ionic-silver state and a fixing step to remove the ionic silver from the light-sensitive material. The bleaching and fixing steps can be combined into a monobath bleach-fix step that can be used alone or in combination with the bleaching and the fixing step. If necessary, additional processing steps may be added, such as a washing step, a stopping step, a stabilizing step and a pretreatment step to accelerate development. The processing chemicals may be liquids, pastes, or solids, such as powders, tablets or granules. As previously explained, the formation of a silver sound track on a color motion picture film in accordance with conventional practice requires additional special processing steps to retain the silver solely in the sound track region of the film. Such processing is described for the Kodak ECP-2B Process, e.g., in Kodak Publication No. H-24, Manual For Processing Eastman Color Films, the disclosure of which is hereby incorporated by reference.

Print film processing in accordance with the invention is characterized in that the soundtrack region of the film is not subjected to any specialized processing treatment relative to the image area frame region. Such previously performed steps no longer needed in accordance with the invention include, e.g., soundtrack drying, soundtrack applicator, soundtrack developer, and soundtrack spray rinse steps. A dye only soundtrack is simply developed in the soundtrack region of the print film as the dye images are formed in the image area frame region.

The following processing steps may be included in the preferable processing steps carried out in accordance with the invention:

1) Color developing→bleach-fixing→washing/stabilizing;

2) Color developing→bleaching→fixing→washing/stabilizing;

3) Color developing→bleaching→bleach-fixing→washing/stabilizing;

4) Color developing→stopping→washing→bleaching→washing→fixing→washing/stabilizing;

5) Color developing→bleach-fixing→fixing→washing/stabilizing;

6) Color developing→bleaching→bleach-fixing→fixing→washing/stabilizing.

Incorporation of a silver containing antihalation layer also eliminates the need for other means of antihalation and backside safelight protection. In a preferred embodiment of the invention, the use of a silver containing antihalation layer in place of a carbon containing "rem-jet" antihalation layer provides further processing simplification advantages.

This combination would allow for the removal of several currently practiced conventional process steps, as a non-remjet film can be processed without prebath and wash steps required prior to the development step for rem-jet containing films. Removing these steps is a great environmental advantage in the processing of motion picture films, due to the large water and chemical savings. Accordingly, this preferred embodiment of the invention allows removal of the following conventional motion picture print film processing steps: the prebath rem-jet removal station, the rem-jet spray rinse, the first fixer, the first fixer wash, the soundtrack dryer, the soundtrack applicator, the soundtrack developer, and the soundtrack spray rinse. These modifications simplify the processing steps considerably yielding various economic and environmental advantages. In one embodiment of the invention, the simplified process used consists essentially of: developer, stop, wash, bleach, bleach wash, fix, wash, final rinse, and dry steps. In a further embodiment of the invention, the process consists essentially of developer, blix, wash, and dry steps.

Dyes which are incorporated into antihalation layers have several disadvantages over silver used for this purpose. An advantage of the silver containing antihalation layer films of the invention over alternative methods of incorporating dyes into an undercoat or backing layer for antihalation protection is that silver is recoverable in standard laboratory operations (desilvering of fixer solutions). Dyes, on the other hand, can season out into the developer solution. As the developer solution overflow is typically reused to make developer replenisher, the dyes in these solutions can accumulate to high levels, and can often have deleterious effects such as: adverse sensitometric responses from films, a higher dirt level in the process, precipitates, clogged filters, negative effects on the level of recycling and the reuse of process solutions and resins, higher chemical usage, and the darker appearance of process solutions.

Due to the spectral differences between the silver and the dye only soundtracks, in accordance with a further preferred embodiment of the invention, the projector systems currently used for films containing silver soundtracks are modified for use with the motion picture print films exposed and processed in accordance with the invention to contain a dye-only soundtrack to improve the performance of the dye-only soundtrack. Most existing sound motion picture projectors incorporate a photodiode in the projector whose radiant sensitivity peaks at approximately 800–950 nanometers (depending on the type of photodiode) to detect the predominant infra-red (IR) radiation emitted by the tungsten lamp and modulated by the film's variable area silver soundtrack. A dye only sound track, however, will modulate light predominantly in the visible region of the spectrum. Although the photodiodes have some sensitivity in the visible range (approximately 380–760 nanometers) of the radiation spectrum, their lower sensitivity in this range, coupled with the lower emission of the light source in the visible range results in a very low input to the sound amplifier. The situation is further aggravated by the fact that the density range between the "clear" minimum density ($D_{min}$) area and the "opaque" maximum density ($D_{max}$) area of a variable area analog soundtrack is less for the dye only soundtrack. If the signal is too low for the amplification stage to operate properly (e.g. signal-to-noise loss), the sound quality will be degraded.

Improved performance for the dye-only soundtracks of the invention can be achieved, e.g., by using the modified soundtrack interface apparatus for a motion picture projectors as described in copending, commonly assigned U.S. Ser. No. 08/245,109 of Nestor M. Rodriguez, filed May 17, 1994, now U.S. Pat. No. 5,483,306 the disclosure of which is hereby incorporated by reference. As disclosed therein, the modified soundtrack interface apparatus for a motion picture projector having an optical soundtrack sensing system including a light source and a photo detector, and a sound amplifier connected to the soundtrack sensing system, includes: a) an infrared filter; b) means for moving the infrared filter into the optical path between the light source and the photodetector when a film having a dye only soundtrack is to be projected, and for moving the infrared filter out of the optical path when a film having a silver soundtrack is to be projected; c) a preamplifier; and d) means for switching the preamplifier into a circuit between the photodetector and the sound amplifier when a film having a dye only soundtrack is to be projected and out of the circuit when a film having a silver soundtrack is to be projected. Such apparatus has the advantage that the soundtrack interface can be inexpensively implemented, the quality of sound is not compromised, and the system is easily switchable from use with dye only to silver sound tracks.

Alternatively, or additionally, improved performance for the dye-only soundtracks of the invention can be achieved by recording and developing the soundtrack in a single photosensitive layer of the print film, and recovering the signal from the dye only soundtrack using a narrow band (e.g., 10–30 nm bandwidth) light source the wavelength of which is chosen so as to coincide with the peak absorbance wavelength of the soundtrack dye. Where the cyan layer of the print film is used to record the soundtrack, e.g., a narrow band red light source would be used for reading the developed soundtrack. A red light emitting diode may be conveniently used for reading cyan dye-only soundtracks, e.g., as has been recently proposed by Dolby Laboratories in an announcement at the Association of Cinema and Video Laboratories (ACVL) Jun. 1–3, 1995 convention at Lake Tahoe, Nev. The use of such relatively monochromatic light sources for the soundtrack reader in combination with a single layer dye soundtrack maximizes the relative optical density difference between the dyed areas and the undyed transparent areas of the soundtrack while maintaining high contrast. While a conventional tungsten light source may perform poorly with a dye only soundtrack due to the relatively low signal generated in the solar cell of the soundtrack reader resulting from the poor modulation of the tungsten light by the image dyes, the use of a narrow monochromatic light source eliminates the presence of unmodulated light outside the absorbance spectrum of the dye only soundtrack striking the solar cell, thereby improving the modulation signal generated by the solar cell.

A motion picture print film comprising a polyethylene terephthalate polyester support bearing yellow, cyan and magenta dye forming coupler containing silver halide emulsion layers sensitive to blue, red, and green light, respectively, on one side thereof and an antistatic layer on the other side thereof, along with additional conventional subbing layers, interlayers and overcoat layers, was prepared. In accordance with the invention, the film further contained an antihalation layer comprising gray silver and gelatin coated between the support and the emulsion layers. The film was imagewise exposed in accordance with desired image area frames, and the cyan dye forming layer was exposed in accordance with a variable area analog soundtrack. The exposed film was then processed to yield corresponding dye images in the image area frames, and a dye-only, silverless analog soundtrack. The film yielded acceptable results for sensitometry, halation latitude, sharpness, graininess, and safelight sensitivity. The film was also found to yield acceptable audio performance for a dye-only soundtrack.

This invention has been described in detail with particular reference to preferred embodiments thereof. It will be understood that variations and modifications can be made within the spirit and scope of the invention.

We claim:

1. A method for recording and processing image area frames and an optical soundtrack in a color motion picture print film comprising a support bearing blue, green, and red light sensitive silver halide emulsion dye forming layers and an antihalation layer, and reading the optical soundtrack, said method comprising:

recording and processing image area frames and an optical soundtrack in the print film by imagewise exposing said emulsion layers in accordance with desired image area frames, exposing one of said blue, green, or red light sensitive silver halide emulsion layers in accordance with an analog soundtrack, and processing the exposed film to yield corresponding dye images in the exposed image area frames and analog soundtrack; wherein the soundtrack is recorded and developed in a single photosensitive dye forming emulsion layer of the print film, wherein said antihalation layer comprises a hydrophilic colloid layer containing silver, and wherein said film is processed to yield a dye-only, silverless analog soundtrack, the soundtrack region of the film not being subjected to any specialized processing treatment relative to the image area frame region, and reading the dye only soundtrack using a narrow band light source the wavelength of which coincides with the peak absorbance wavelength of the soundtrack dye.

2. The method of claim 1, wherein said soundtrack is exposed in said single emulsion layer with a light source corresponding to the peak sensitivity of the emulsion layer.

3. The method of claim 2, wherein said single emulsion layer is a red-light sensitive emulsion layer and the exposing light source is a red light emitting diode laser.

4. The method of claim 1, wherein the film processing comprises a single development step.

5. The method of claim 1, wherein the film processing consists essentially of developing, stop, wash, bleach, bleach wash, fix, wash, rinse, and drying steps.

6. The method of claim 1, wherein the film processing consists essentially of developing, blix, wash, and drying steps.

7. The method of claim 1, wherein the antihalation layer is coated between the silver halide emulsion layers and the support.

8. The method of claim 1, wherein the red sensitive dye forming layer of the print film is used to record the soundtrack, a cyan dye only soundtrack is developed, and a narrow band red light source is used for reading the developed soundtrack.

9. The method of claim 8, wherein a red light emitting diode is used for reading the cyan dye-only soundtrack.

10. A method for recording and processing image area frames and an optical soundtrack in a color motion picture film comprising a support bearing blue, green, and red light sensitive silver halide emulsion dye forming layers and an antihalation layer, and reading the optical soundtrack, said method comprising:

recording and processing image area frames and an optical soundtrack in the film by imagewise exposing said emulsion layers in accordance with desired image area frames, exposing at least one of said emulsion layers in accordance with an analog soundtrack, and processing the exposed film to yield corresponding dye images in the exposed image area frames and analog soundtrack; wherein said antihalation layer comprises a hydrophilic colloid layer containing silver, and wherein said film is processed to yield a dye-only, silverless analog soundtrack, the soundtrack region of the film not being subjected to any specialized processing treatment relative to the image area frame region, and reading the dye only soundtrack with a motion picture projector optical soundtrack sensing system including a light source and a photo detector, and a sound amplifier connected to the soundtrack sensing system, wherein said soundtrack sensing system includes soundtrack interface apparatus comprising: a) an infrared filter; b) means for moving the infrared filter into the optical path between the light source and the photodetector when a film having a dye only soundtrack is to be projected, and for moving the infrared filter out of the optical path when a film having a silver soundtrack is to be projected; c) a preamplifier; and d) means for switching the preamplifier into a circuit between the photodetector and the sound amplifier when a film having a dye only soundtrack is to be projected and out of the circuit when a film having a silver soundtrack is to be projected; and wherein the infrared filter is in the optical path between the light source and the photodetector, and the preamplifier is in the circuit between the photodetector and the sound amplifier.

11. The method of claim 10, wherein the film processing comprises a single development step.

12. The method of claim 10, wherein the film processing consists essentially of developing, stop, wash, bleach, bleach wash, fix, wash, rinse, and drying steps.

13. The method of claim 10, wherein the film processing consists essentially of developing, blix, wash, and drying steps.

14. The method of claim 10, wherein the antihalation layer is coated between the silver halide emulsion layers and the support.

* * * * *